United States Patent Office 3,043,675
Patented July 10, 1962

3,043,675
AGRICULTURAL COMPOSITION AND METHOD
Arnolds Steinhards, Kalamazoo Township, Kalamazoo County, Mich., and Wilhelm Mathes, Ludwigshafen am Rhine, Germany, assignors to Dr. F. Raschig, G.m.b.H., Ludwigshafen am Rhine, Germany, a company of Germany
No Drawing. Filed Dec. 7, 1959, Ser. No. 857,579
6 Claims. (Cl. 71—2.5)

The present invention relates to methods and compositions for improving the crop-bearing properties of soil, and is more particularly concerned with the use of O-ethers of pyridinealdoximes for the improvement of the crop-bearing properties of soil by the eradication therefrom of undesired vegetation and/or nematodes.

This application is a continuation-in-part of copending application Serial No. 730,241, filed April 23, 1958, now Patent No. 2,924,604.

We have found that compounds of the following general formula:

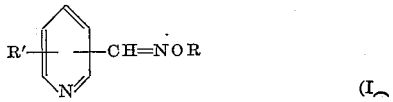

(I)

wherein R is a hydrocarbon radical containing from 1 to 12 carbon atoms and R' is selected from the class consisting of hydrogen and methyl, and the acid addition salts thereof, possess valuable properties as herbicides and can be used as general purpose weedkillers or as selective weedkillers, for example, for the control of crabgrass, bindweed, herbs such as buckwheat, and like undesirable vegetation alone or in the presence of crops, for example, corn, beans, perennial grasses, etc. By "undesirable vegetation" is meant not only plants which are commonly regarded as weeds wherever they may grow, but also certain plants which are not normally regarded as weeds except when they are found growing on land which is supporting more valuable plants, for example, horticultural and agricultural crops.

We have also found that those compounds having the Formula I above in which the group —CH=NOR is in the 4-position in the pyridine nucleus, the radical R is alkyl containing from 1 to 12 carbon atoms, inclusive, and R' is hydrogen, possess valuable nematocidal properties and can be employed in the control of nematocidal infestations in soil as will be more particularly described hereinafter.

The term "hydrocarbon radical containing from 1 to 12 carbon atoms" includes (a) saturated and unsaturated acyclic aliphatic hydrocarbon radicals such as alkyl radicals of which examples are methyl, ethyl, propyl, butyl, amyl, hexyl, heptyl, octyl, nonyl, decyl undecyl and dodecyl radicals and alkenyl radicals of which examples are allyl, butenyl, pentenyl, hexenyl, heptenyl, and octenyl radicals, (b) saturated and unsaturated cycloaliphatic hydrocarbon radicals of which examples are cyclopropyl, cyclobutyl, cyclopentyl, 2-cyclopentenyl, 1-cyclopentyl, cyclohexyl, 2-cyclohexenyl, cycloheptyl, and cyclooctyl radicals, (c) saturated and unsaturated cycloaliphaticalkyl hydrocarbon radicals of which examples are cyclopentylmethyl, 2-cyclopentenylmethyl, cyclohexylmethyl, 2-cyclohexenylmethyl, and cyclohexylethyl radicals, and (d) saturated and unsaturated araliphatic hydrocarbon radicals of which examples are benzyl, 2-phenethyl, cinnamyl, 1-naphthylmethyl, and 2-naphthylmethyl radicals; and the like. The acid addition salts include the salts of compounds of the above general formula with acids such as hydrochloric acid, sulfamic acid, hydrobromic acid, thiocyanic acid, fluosilicic acid, nitric acid, phosphoric acid, sulfuric acid, formic acid, acetic acid, trichloroacetic acid, propionic acid, oxalic acid, succinic acid, methanesulfonic acid, p-toluenesulfonic acid, picric acid, benzoic acid, salicyclic acid, etc.

The compounds having the Formula I above can be prepared by the methods described in our copending application Serial No. 730,241, filed April 23, 1958. Compounds having the Formula I above include the following: the O-n-propyl ether, the O-isoamyl ether, and the O-n-amyl ether of 2-pyridinealdoxime, the O-n-propyl ether, the O-isoamyl ether, and the O-2-phenethyl ether of 3-pyridinealdoxime, the O-n-propyl ether, the O-isoamyl ether, and the O-2-phenethyl ether of 4-pyridinealdoxime, the O-n-propyl ether, the O-isoamyl ether, the O-benzyl ether, and the O-2-phenethyl ether of 6-methyl-2-pyridinealdoxime, and the O-allyl ether of 2-methyl-4-pyridinealdoxime.

The herbicidal activity of the compounds having the Formula I is illustrated by the results of the following test. The test was carried out by spraying seedling plants to run off with an aqueous dispersion of various concentrations of the compound under test, the spray solution containing approximately 100 parts per million (0.01 percent) of Triton X-100 (a proprietary surfactant which is an alkylaryl polyether alcohol). The plants were examined 2 to 4 weeks after the application of the test compound and the condition of the crops was recorded on an arbitrary scale of 0 (no effect) through 5 (all plants dead). In Table I there is shown the name of the test compound, the concentration of compound in the final spray, the plants treated, and the final condition of the plants as expressed using the arbitrary scale.

For the selective control of undesired vegetation the compounds having Formula I are applied at a rate within the range of about 0.02 to 20 pounds per acre, the preferred rate of application being about 0.5 to 7 pounds per acre. Illustratively, the O-2-phenethyl ether of 6-methyl-2-pyridinealdoxime shows outstanding selective activity against grasses, including crabgrass growing in broadleaf crops, for example, beans and cucumbers.

TABLE I

| Compound | Conc. in final spray (p.p.m.) | Plant | | | |
|---|---|---|---|---|---|
| | | Crabgrass | Wheat | Buckwheat | Bindweed |
| O-n-propyl ether of 2-pyridine-aldoxime | 8,000 | | 2 | 5 | 2 |
| | 4,000 | | 0 | 2 | 2 |
| O-n-propyl ether of 6-6-methyl-2-pryidine-aldoxime | 8,000 | | 3 | 1 | 3 |
| O-n-amyl ether of 2-pyridine-aldoxime | 6,000 | | 4 | 2-3 | 0 |
| | 3,000 | | 2 | 1-2 | 0 |
| O-2-phenethyl ether of 3-pyridine-aldoxime | 6,000 | | 4 | 5 | 4 |
| | 3,000 | | 2 | 4 | 1 |
| O-2-phenetyhl ether of 4-pyridine-aldoxime | 6,000 | | 3 | 5 | 4 |
| | 3,000 | | 4 | 5 | 4 |
| O-2-phenethyl ether of 6-methyl-2-pyridine-al-noxime | 6,000 | | 5 | 5 | 4 |
| | 3,000 | | 3 | 3 | 1 |
| | 2,000 | 5 | | | |
| O-benzyl ether of 6-methyl-2-pyridine-al-doxime | 6,000 | | 5 | 5 | 4 |
| | 3,000 | | 2 | 4 | 3 |
| | 2,000 | 3 | | | |
| O-isoamyl ether of 3-pyridine-aldoxime | 6,000 | | 1 | 5 | 1 |
| | 3,000 | | 1 | 1 | 1 |
| | 2,000 | 5 | | | |
| O-isoamyl ether of 4-pyridine-aldoxime | 6,000 | | 4 | 4 | 1 |
| | 3,000 | | 1 | 4 | 2 |
| | 2,000 | 5 | | | |
| O-isoamyl ether of 6-methyl-2-puridine-al-doxime | 6,000 | | 2 | 2 | 2 |
| | 3,000 | | 1 | 1 | 0 |
| | 2,000 | 5 | | | |
| O-isoamyl ether of 2-pyridine-aldoxime | 6,000 | | 1 | 1 | 0 |
| | 3,000 | | 0-1 | 2 | 1 |
| | 2,000 | 5 | | | |

For the non-selective control of undesired vegetation the compounds having the Formula I are applied at a rate within the range of about 0.2 to 30 pounds per acre, the preferred rate of application being about 3 to 10 pounds per acre.

In order to achieve the maximum herbicidal effect of the compounds having the Formula I it is necessary to formulate the compounds in compositions which can be freely applied to vegetation and evenly distributed over the surface thereof. Accordingly, the method of preparation of the herbicidal compositions of the invention is a matter of importance.

The herbicidal compositions of the invention comprise as active ingredient at least one compound selected from the class of compounds having the Formula I above and the acid addition salts thereof, in association with a carrier material. Where the compositions are to be employed as selective herbicides it is advantageous that the carrier material be phytonomic, that is to say, a carrier that can be applied to plants without phytotoxicity or other adverse effects. Where the compositions are to be employed as general herbicides such considerations do not apply.

The herbicidal compositions of the invention can take the form of dusts which are prepared by intimate admixture of the active ingredient with a solid carrier or extender which maintains the compositions in a dry, free-flowing state. Since the compounds of the above formula in the free base form are liquid, the herbicidal dusts of the invention can be prepared more conveniently by adding to the solid diluent the compound in solution in a volatile solvent such as ethanol or acetone, mixing to form a paste, drying, and milling. The solid carriers which can be used include the natural clays such as china clay and bentonite, minerals in the natural state such as talc, pyrophyllite, quartz, diatomaceous earth, fuller's earth, chalk, rock phosphate, and the chemically modified minerals such as washed bentonite, precipitated calcium phosphate, precipitated calcium carbonate, and colloidal silica. The solid diluents which can be employed in the compositions also include solid artificial fertilizers. The above types of solid compositions can be applied to vegetation in the form of dusts by use of conventional machinery. A preferred solid composition of the above type is one which also comprises a surfactant. Such compositions can be added to water to form aqueous dispersions which can be applied to vegetation by conventional spraying machines. The surfactants which can be employed in the preparation of such compositions include alkyl sulfates and sulfonates, alkylbenzenesulfonates, sulfosuccinate esters, polyoxyethylene sulfates, polyoxyethylene sorbitan monolaurate, alkylarylpolyether sulfates, alkylarylpolyether alcohols, alkylnaphthalenesulfonates, alkyl quaternary ammonium salts, sulfated fatty acid and esters, sulfated fatty acid amides, glycerol mannitan laurate, polyalkylether condensates of fatty acids, and lignin sulfonates, the sulfates and sulfonates, of course, being used in the form of the soluble salts, for example, their sodium salts.

The herbicidal compositions of the invention also comprise aqueous emulsions. The aqueous emulsions can be prepared by dissolving the active ingredient in a water-miscible solvent such as Carbitol (diethylene glycol monoethyl ether), acetone or a lower alkanol, if desired, in association with a surfactant such as noted above, and pouring the solution into water with vigorous agitation. The emulsions can be prepared also by dissolving the active ingredient and a surfactant such as noted above in an organic solvent which is immiscible with water. The resulting solution is then admixed with water with vigorous agitation to form an emulsion. The organic solvents which are suitable for use include aromatic hydrocarbons such as benzene, toluene, xylene and high-boiling petroleum hydrocarbons such as kerosene, diesel oil, etc.

The aqueous emulsions of the invention can be supplied to the user in the form of concentrates which require dilution with water before use. Both the concentrated compositions and the diluted compositions are included within the scope of the present invention.

The exact concentration of active ingredient in any of the compositions of the invention is not critical and may vary considerably, provided the active ingredient is applied to the vegetation to be treated at a rate within the range defined above. However, in general it has been found advantageous to employ concentrations of active ingredient of the order of 1,000–10,000 parts per million (0.1–1.0 percent) in the aqueous emulsions or dispersions use for the treatment of vegetation. The concentration of active ingredient in the concentrates from which these compositions are prepared may be as high as the order of 50 percent by weight. The concentration of active ingredient in the dust formulations of the invention is limited, in the case of compounds in the free base form, by the oily nature of the compounds. However, the concentration of active ingredient in the dust formulations of the invention is advantageously of the order of 1 to 15 percent by weight.

The concentrations and the rates at which the compositions of the invention are applied will of course vary in accordance with factors such as the nature of the vegetation being treated, whether the treatment is a selective one, the season of the year at which the treatment is made, and the nature of the machine which is used to apply the composition.

The compositions of the invention also include compositions in which the compounds having the Formula I are employed in combination with known herbicides. Such known herbicides include 2,4-dichlorophenoxyacetic acid, 2-methyl-4-chlorophenoxyacetic acid, 2,4,5-trichlorophenoxyacetic acid, ammonium sulfamate, dinitro-o-cresol, sodium arsenite, phenylmercuric acetate, isopropyl N-phenylcarbamate, isopropyl N-(3-chlorophenyl)carbamate, 3-(p-chlorophenyl)-1,1-dimethylurea, trichloroacetic acid, 2,2-dichloropropionic acid, sodium pentachlorophenate, and sodium chlorate.

The compounds having the Formula I above in which the group —CH=NOR is in the 4-position of the pyridine nucleus, the radical R represents alkyl containing from 1 to 12 carbon atoms, inclusive, and the radical R' represents hydrogen, also exhibit activity against plant endo- and ecto-parasitic nematodes such as those of the genera Heterodera, Meloidogyne, Ditylenchus, and the like. These and like nematodes attack the root systems of crops such as cotton, tobacco, potatoes, tomato, carrots, celery, etc., and also of ornamental plants and shrubs.

Illustratively, the activity of the O-n-propyl ether and the O-isoamyl ether of 4-pyridinealdoxime against the nematode *Meloidogyne incognita* var. *acrita* is demonstrated by the following results.

Tomato roots having heavy formations of root knot galls were diced and then added to sterilized soil (a mixture of sand, peat, and clay), thus providing a heavy infestation of the nematode *Meloidogyne incognita* var. *acrita*. The infested soil was then divided into 4 equal portions, 3 portions of which were treated as follows and one portion was left untreated as a control.

(a) The infested soil was spread out in a layer of ¼ inch in depth on a table top and was sprayed at the rate of 100 pounds per acre with a composition comprising the test compound in suspension in water. The sprayed soil was mixed thoroughly and placed in a container.

(b) The infested soil was treated, in a container with an average soil depth of 3 inches, by pouring onto the surface of the soil a composition comprising the test compound in suspension in water at a rate of 100 pounds per acre.

(c) The infested soil was mixed intimately with a composition prepared by blending 1 part of test compound with 500 parts of vermiculite. This composition was added to the soil at a rate to give a concentration of 100 pounds of active ingredient per acre.

Each of the portions of infested soil was allowed to stand for 96 hrs. after treatment and then 4-day-old cucumber seedlings (grown in sterilized sand) were planted in pots containing the untreated or one of the variously treated infested soils. Three plants were used in each treatment and in the control (untreated infested soil). The plants were then placed in a greenhouse where the soil temperature was maintained at 80° F. At the end of 15 days the plants were removed and examined for root knot formation. The recovered soil was again placed in pots and used to plant 4-day-old cucumber seedlings as before. At the end of a second 15-day period the soil was washed from the cucumber roots and the latter were examined for root knot formation. In Tables II and III are shown the results obtained in these tests in the first and the second 15-day periods, respectively. The "% control" represents the percent of root area free from root knot formation determined visually at the end of the first 15-day period and by actual root knot count at the end of the second 15-day period.

TABLE II

*First 15-Day Period*

| O-ether of 4-pyridinealdoxime | Treatment, percent control | | |
|---|---|---|---|
| | (a) | (b) | (c) |
| n-propyl | 100 | 100 | |
| isonamyl | 97 | 98 | 97 |
| Untreated | 0 | 0 | 0 |

TABLE III

*Second 15-Day Period*

| O-ether of 4-pyridinealdoxime | Treatment, percent control | | |
|---|---|---|---|
| | (a) | (b) | (c) |
| n-propyl | 100 | 90 | 80 |
| isonamyl | 80 | 80 | 50 |
| Untreated | 0 | 0 | 0 |

In order to achieve effective control of nematocidal infestations in soil it is necessary to treat the soil, either before planting or at the time of planting of a crop or shortly thereafter, with a compound having the formula (I) above, in which the group —CR=NOR is in the 4-position of the pyridine nucleus, the radical R represents alkyl containing from 1 to 12 carbon atoms, inclusive, and the radical R' represents hydrogen, at a rate within the range of about 5 pounds to about 100 pounds per acre of soil. Preferably the active compound is applied at a rate within the range of about 10 pounds to about 30 pounds per acre of soil.

The application of the active compound to the soil can be carried out in a number of ways. Thus the active compound can be formulated as an aqueous dispersion or as an oil-in-water emulsion, using the methods hereinbefore described for the preparation of herbicidal compositions of the invention, and sprayed on the soil to be treated using conventional landborne or airborne spraying equipment. For this type of treatment it is preferable to employ aqueous dispersions or emulsions containing from about 1 percent to about 30 percent of active compound.

Alternatively, aqueous dispersions or emulsions containing the active compound can be applied to the soil as drenches using procedures well-known in the art. In this form of treatment the concentration of active compound in the formulations is generally low, i.e., of the order of about 50 p.p.m. to about 2000 p.p.m., and large volumes of the compositions are applied (the total dosage being within the above defined limits) so that substantial penetration of the soil occurs. Frequently the application of the drench is followed by application of an approximately equal volume of water so that the depth of penetration of soil by the active ingredient is increased further.

A particularly convenient manner in which infested soil can be treated is that known as "band treatment" which consists in applying the active compound, as an aqueous dispersion or emulsion, to the furrow at the time at which the crop is planted. This can be accomplished by applying the nematocidal composition through a jet or similar device attached to the planting machine. The liquid nematocidal compositions of the invention can also be applied in a convenient manner through a jet or similar device attached to a plough or to a harrow. Application in conjunction with harrowing is particularly convenient where treatment is required of soil supporting an established crop.

The nematocidally active compounds of the invention can also be formulated as dusts using inert solid diluents as described above. Particularly suitable inert diluents are vermiculite or a solid fertilizer since these not only act as carrier for the nematocidal agent but also serve to condition the soil. These solid compositions of the invention can be applied to the soil before planting of the crop or can be applied as side dressings to established crops using methods well-known in the art. The concentration of active compound in these solid compositions is advantageously within the range of about 1 percent to about 80 percent.

The term "soil" is employed in the present specification and claims in its broadest sense to be inclusive of all conventional "soils." Thus the term "soil" refers to a solid substance in which vegetation may take root and grow and includes not only earth but compost, manure, muck, humus, sand, and the like, adapted to support plant growth.

The following examples are illustrative of the process and products of the present invention, but are not to be construed as limiting.

EXAMPLE 1

An emulsifiable concentrate suitable for dilution with water to give a herbicidal emulsion was prepared by dissolving 2 g. of the O-2-phenethyl ether of 6-methyl-2-pyridinealdoxime and 0.25 g. of Triton X-100 (an alkylaryl polyether alcohol) in 8 g. of Carbitol (diethylene glycol monoethyl ether) to form a clear solution. This solution is added to 500 ml. of water to yield an oil-in-water emulsion containing 4000 parts per million of active ingredient. The emulsion is employed as a herbicide by application to vegetation at the rate of 2.5 to 5 gallons per 1000 square feet.

Using the same procedure, emulsifiable concentrates and oil-in-water emulsions can be prepared using as active ingredient one or more of the following compounds: the O-n-propyl ether, the O-isoamyl ether, and the O-n-amyl ether of 2-pyridinealdoxime; the O-n-propyl ether, the O-isoamyl-ether, and the O-2-phenethyl ether of 3-pyridinealdoxime; the O-n-propyl ether, the O-isomyl ether, and the O-2-phenethyl ether of 4-pyridinealdoxime; the O-n-propyl ether, the O-isomyl ether, and the O-benzyl ether of 6-methyl-2-pyridinealdoxime; and the O-allyl ether of 2-methyl-4-pyridinealdoxime.

An emulsifiable concentrate prepared as described above using the O-n-propyl ether of 4-pyridinealdoxime as active ingredient is diluted with water to yield an oil-in-water emulsion containing 2000 p.p.m. of active ingredient. The emulsion so obtained is employed in the control of nematode infestations of soil by application as a drench at a rate of 1 gallon per square yard of soil to be treated.

EXAMPLE 2

A dispersible powder suitable for addition to water to form an aqueous dispersion was prepared by mixing intimately 3 g. of the O-2-phenethyl ether of 6-methyl-2-pyridinealdoxime and 7 g. of calcium silicate having a particle size of the order of 5 microns. To the product was added 0.5 g. of Pluronic F-68 (an ethylene oxide-propylene glycol condensate) and the mixture was macerated to give a fine dry powder. This powder is added to 1 liter of water to give an aqueous dispersion containing 3000 parts per million of active ingredient.

Using the same procedure, dispersible powders and aqueous dispersions can be prepared using as active ingredient one or more of the following compounds: the O-n-propyl ether, the O-isoamyl ether, and the O-n-amyl ether of 2-pyridinealdoxime; the O-n-propyl ether, the O-isoamyl ether, and the O-2-phenethyl ether of 3-pyridinealdoxime; the O-n-propyl ether, the O-isoamyl ether, and the O-2-phenethyl ether of 4-pyridinealdoxime; the O-n-propyl ether, the O-isoamyl ether, and the O-benzyl ether of 6-methyl-2-pyridinealdoxime; and the O-allyl ether of 2-methyl-4-pyridinealdoxime.

We claim:
1. An agricultural composition comprising water, a surfactant, and from about 0.1 to about 80 percent of a compound selected from the class consisting of compounds having the formula:

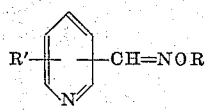

wherein R is a hydrocarbon radical containing from 1 to 12 carbon atoms, inclusive, selected from the class consisting of alkyl, alkenyl, cycloalkyl, cycloalkenyl, cycloalkylalkyl, cycloalkenylalkyl, aralkyl and aralkenyl radicals, and R′ is selected from the class consisting of hydrogen and methyl.

2. A herbicidal composition comprising an inert solid pulverulent carrier and from about 0.1 to about 50 percent of a compound selected from the class consisting of the O-isoamyl and the O-2-phenethyl ethers of 6-methyl-2-pyridinealdoxime.

3. A method of controlling undesired vegetation which comprises applying to the vegetation, in an amount sufficient to exert herbicidal action, a compound selected from the class consisting of compounds of the formula:

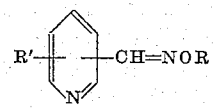

wherein R is a hydrocarbon radical containing from 1 to 12 carbon atoms, inclusive, selected from the class consisting of alkyl, alkenyl, cycloalkyl, cycloalkenyl, cycloalkylalkyl, cycloalkenylalkyl, aralkyl and aralkenyl radicals, and R′ is selected from the class consisting of hydrogen and methyl, and the acid addition salts thereof.

4. A method of controlling selectively the growth of crabgrass in the presence of growing desirable crops which comprises applying to the crops containing crabgrass, in an amount sufficient to exert herbicidal action, a compound selected from the class consisting of compounds of the formula:

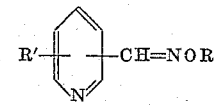

wherein R is a hydrocarbon radical containing from 1 to 12 carbon atoms, inclusive, selected from the class consisting of alkyl, alkenyl, cycloalkyl, cycloalkenyl, cycloalkylalkyl, cycloalkenylalkyl, aralkyl and aralkenyl radicals, and R′ is selected from the class consisting of hydrogen and methyl.

5. A method of controlling undesired vegetation which comprises applying to the vegetation, in an amount sufficient to exert herbicidal action, a compound selected from the class consisting of the O-isoamyl and the O-2-phenethyl ethers of 6-methyl-2-pyridinealdoxime.

6. A method of controlling nematode infestations of soil which comprises applying to the soil, in an amount sufficient to exert nematocidal action, a compound selected from the class consisting of compounds having the formula:

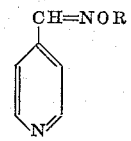

wherein R represents an alkyl radical containing from 1 to 12 carbon atoms, inclusive.

References Cited in the file of this patent
UNITED STATES PATENTS

| | | |
|---|---|---|
| 2,909,553 | Stephens | Oct. 20, 1959 |
| 2,924,604 | Steinhards et al. | Feb. 9, 1960 |

FOREIGN PATENTS

| | | |
|---|---|---|
| 1,009,422 | Germany | May 29, 1957 |